UNITED STATES PATENT OFFICE.

CHARLES W. SCHNELL, OF PHILADELPHIA, PENNSYLVANIA, ASSIGNOR TO CHARLES W. SCHNELL & CO., OF SAME PLACE.

REMEDY FOR CATARRH.

SPECIFICATION forming part of Letters Patent No. 259,590, dated June 13, 1882.

Application filed April 11, 1882. (No specimens.)

*To all whom it may concern:*

Be it known that I, CHARLES W. SCHNELL, a citizen of the United States, residing in the city and county of Philadelphia, State of Pennsylvania, have invented a new and useful Improvement in a Remedy for Catarrh, which improvement is fully set forth in the following specification.

In carrying out my invention I take powdered borax, twelve pounds; powdered bicarbonate of soda, three pounds; powdered sugar, three pounds; powdered burnt alum, one pound; powdered salt, six ounces; powdered saffron, three drams; powdered blood-root two drams; powdered sassafras-root, two drams, and powdered cubebs one and a half dram, the proportions being varied as desired.

The several ingredients are well mixed, forming a powder or snuff, a pinch of which is occasionally to be applied to the nostrils.

Some of the ingredients are of a nature to purify the blood, and this, with the general effect of the composition on the affected parts, serves to soothe the same and remedy the disorder.

Having thus described my invention, what I claim as new, and desire to secure by Letters Patent, is—

The composition of matter consisting of powdered borax, bicarbonate of soda, sugar, burnt alum, salt, saffron, blood-root, sassafras-root, and cubebs in the proportions stated, forming a remedy for catarrh, as herein set forth.

CHAS. W. SCHNELL.

Witnesses:
JOHN A. WIEDERSHEIM,
A. P. GRANT.